United States Patent [19]
Vollmann et al.

[11] Patent Number: 5,214,554
[45] Date of Patent: May 25, 1993

[54] CASSETTE FOR A RECORD CARRIER

[75] Inventors: Norbert Vollmann; Peter J. Doodson, both of Eindhoven, Netherlands; Anton Stöger; Günther Bernauer, both of Vienna, Austria

[73] Assignee: U.S. Philips Corporation, New York, N.Y.

[21] Appl. No.: 771,377

[22] Filed: Sep. 30, 1991

[30] Foreign Application Priority Data

Oct. 11, 1990 [AT] Austria ............................ 2048/90

[51] Int. Cl.$^5$ .............................................. G11B 23/02
[52] U.S. Cl. .................................. 360/132; 242/199
[58] Field of Search ......................... 360/132; 242/199

[56] References Cited

U.S. PATENT DOCUMENTS

| | | | |
|---|---|---|---|
| 3,759,465 | 9/1973 | Janssen et al. | 360/132 |
| 4,379,314 | 4/1983 | Kamimura et al. | 242/199 |
| 4,399,480 | 8/1983 | Edwards | 242/199 |
| 4,503,474 | 3/1985 | Nigam | 360/133 |
| 4,614,270 | 9/1986 | Oishi | 360/132 |
| 4,618,903 | 10/1986 | Oishi et al. | 360/132 |
| 4,905,113 | 2/1990 | Shiba et al. | 360/132 |
| 5,022,520 | 6/1991 | Yeol et al. | 242/199 |

Primary Examiner—Bruce C. Anderson
Attorney, Agent, or Firm—Brian J. Wieghaus

[57] ABSTRACT

A cassette (1) for a record carrier (10) is provided with a sliding cover (2) for covering at least one opening (13, 14, 15, 16, 17, 18, 19, 20, 21) in the cassette housing (3), which cover has at least one plate-shaped flange (28) which extends parallel to a main wall (5) of the cassette housing (3), hold-down means (41) overlying its edge zone (31), which extends parallel to the direction of movement (22) of the sliding cover (2) and has a given length (L), in order to hold down the flange (28). Suitably, the hold-down means (41) comprise at least two hold-down members (50, 51) whose dimension (A) parallel to the direction of movement (22) of the sliding cover (2) is only a fraction of the length (L) of the edge zone (31) of the flange (28) of the sliding cover (2), over which edge zone said hold-down members engage.

7 Claims, 3 Drawing Sheets

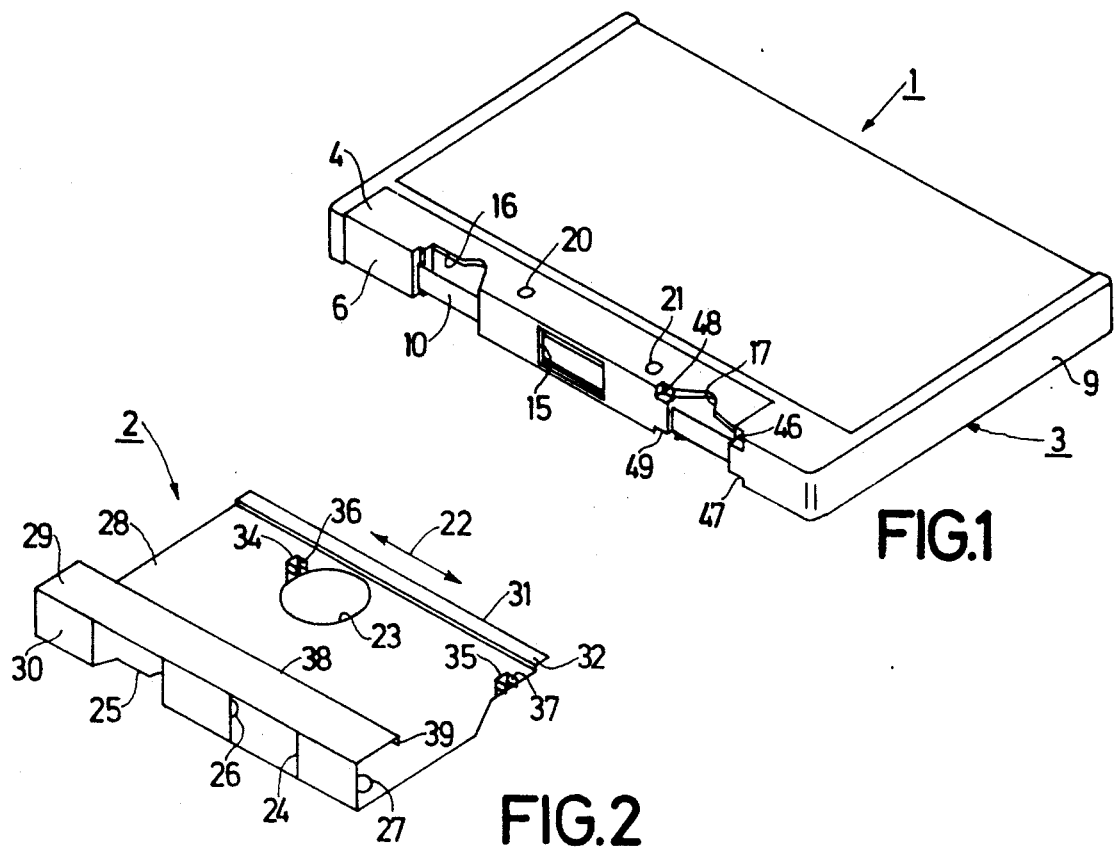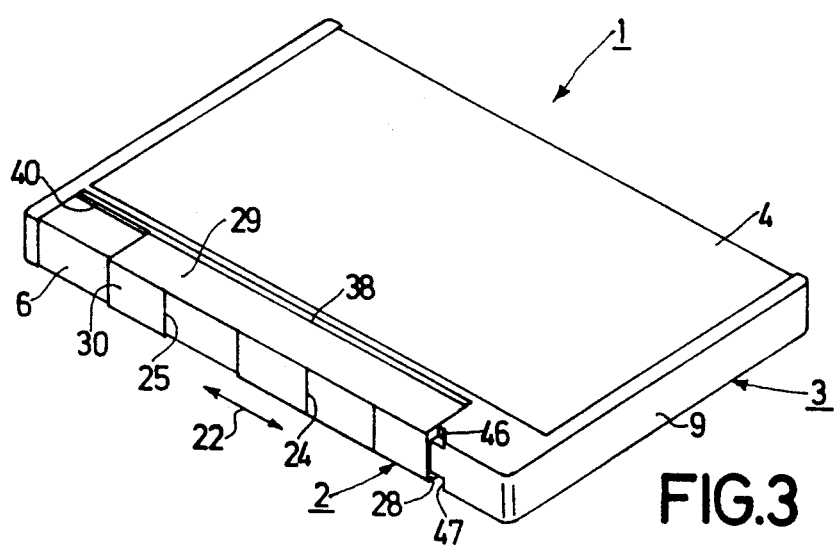

CASSETTE FOR A RECORD CARRIER

BACKGROUND OF THE INVENTION

The invention relates to a cassette for a record carrier which can be scanned by scanning means for the purpose of making and/or reproducing recordings, which cassette has a substantially rectangular cassette housing accommodating the record carrier and having at least one access area for the record carrier, in which area the scanning means can enter into cooperation with the record carrier for the purpose of scanning, at least one sliding cover which is guided on the cassette housing so as to be movable parallel to a direction of movement, which cover is movable between a closed position, in which the cover at least partly covers the access area, and an open position, in which the cover exposes the access area, and comprises at least one plate-shaped portion extending parallel to a main wall of the cassette housing and having an edge zone of predetermined length which extends substantially parallel to the direction of movement of the sliding cover, and hold-down means connected to the cassette housing and engaging over the plate-shaped portion in the edge zone thereof, which hold-down means thus prevent the plate-shaped portion of the sliding cover from being lifted off the main wall of the cassette housing.

A cassette of the type defined in the opening paragraph is known from EO 0,218,231 A2. This is a cassette for a round disc-shaped rotatable record carrier. The known cassette has an access area in the form of a slot-like opening in each of the two main walls of the cassette housing. Through each of the two openings a magnetic head can be made to cooperate with the round disc-shaped record carrier in the cassette housing for the purpose of scanning. In order to cover the two openings there is provided a U-shaped sliding cover whose web portion is connected to a cover support which is slidably guided in the cassette housing. At the location of their free ends, i.e. in their edge zones, a pressure plate serving as a hold-down means overlies each of the plate-shaped flanges of the sliding cover to prevent the plate-shaped flanges to be lifted off the main walls of the cassette. Parallel to the direction of movement of the sliding cover the pressure plates are dimensioned in such a way that both when the sliding cover is its closed position and in its open position the pressure plates overlie the edge zones of the plate-shaped flanges over their whole length. As a result of this comparatively large dimension of the pressure plates parallel to the direction of movement of the sliding cover the problem arises that in the case of larger temperature fluctuations these pressure plates tend to warp, which disturbs their correct hold-down function or results in excessive frictional forces being exerted on the sliding cover by the pressure plates, which may lead to a poor slidability and even to jamming of the sliding cover. Moreover, such comparatively long pressure plates, which cover the entire range of movement of the edge zone of the sliding cover, have the problem that dirt particles may settle in the grooved area which extends over the entire range of movement between a pressure plate and the facing main wall of the cassette housing and thereby impair a correct movement of the sliding cover. Such pressure plates may be integral with the cassette housing, but this complicates the production of the cassette housing, or they may be constructed as separate parts connected to the cassette housing by, for example, adhesive means or ultrasonic welding; however, such separate pressure plates are difficult to manufacture accurately to size and are comparatively difficult to handle during mounting on the cassette housing, particularly in the case of automated mounting because they are difficult to align and because they have the undesirable tendency to become warped as a result of their low stiffness.

SUMMARY OF THE INVENTION

It is the object of the invention to mitigate the above problems with a cassette of the type defined in the opening paragraph, to guarantee in a simple way that the hold-down means always function correctly, and to prevent dirt particles from settling between the hold-down means and the facing main wall of the cassette housing. To this end the invention is characterised in that the hold-down means comprise at least two mutually spaced-apart hold-down members which parallel to the direction of movement of the sliding cover each have a dimension which is only a fraction of the length of the edge zone of the plate-shaped portion of the sliding cover, over which edge zone the hold-down members engage. Since the dimension of the hold-down members parallel to the direction of movement of the sliding cover is only a fraction of the length of the edge zone of the flange of the sliding cover, over which edge zone the hold-down members engage, temperature fluctuations hardly affect the shape of the hold-down members, so that the hold-down members always perform a constant and trouble-free hold-down function over the entire permissible temperature range. The small dimensions of the hold-down members have the advantage that no dirt particles can settle between the hold-down members and the facing main wall of the cassette housing, so that the slidability of the sliding cover cannot be impaired by such dirt particles.

The hold-down members may be integral with the cassette housing. However, it is found to be advantageous if the hold-down members are constituted by parts which are separate from the cassette housing and which are fixedly connected to the cassette housing after the sliding cover has been mounted on the cassette housing. This has the advantage that the sliding cover can be mounted on the cassette housing in a simple manner without being hindered by the hold-down members. The hold-down members can be connected to the cassette housing, for example by ultrasonic welding if the cassette housing and the hold-down members are made of a plastics.

It is found to be advantageous if at the location of the respective end which is remote from the plate-shaped portion of the sliding cover the hold-down members engage recesses in the main wall of the cassette housing to which the plate-shaped portion of the sliding cover extends substantially parallel, and the recesses are adapted to the shape of the hold-down members. This is advantageous in order to mount the hold-down members on the cassette housing in the simplest possible way, the recesses also positioning the hold-down members before these members are fixedly connected to the cassette housing.

Moreover, it is found to be advantageous if at the location of its end which is remote from the edge zone of the plate-shaped portion of the sliding cover each hold-down member has a projection which, in a cross-sectional view perpendicular to the direction of movement of the sliding cover, extends at a right angle to the associated hold-down member and which engages a locating aperture in the cassette housing. This enables the hold-down members to be connected to the cassette housing in a very simple manner, the projections in conjunction with the locating aperatures ensuring a very accurate positioning of the hold-down members and preventing the hold-down members from slipping out of the recesses as long as the hold-down members have not yet been fixedly connected to the cassette housing.

It is then found to be very advantageous if the projection of each hold-down member is constructed as a ridge which extends parallel to the direction of movement of the sliding cover and which engages a slot formed as a locating aperture in the cassette housing. In comparison with projections of another type such a ridge is very stable and highly resistant to fracture, which is particularly advantageous in the case of automated mounting of the hold-down members on the cassette housing, because this considerably reduces the likelihood of rejects.

It is also found to be advantageous if in its edge zone the plate-shaped portion of the sliding cover has a stepped portion which is offset from the plane of the plate-shaped portion towards the cassette housing, the main wall of the cassette housing is formed with a trough-shaped recess to receive the stepped portion of the sliding cover, and the hold-down members overlie the plate-shaped portion of the sliding cover only at the location of the stepped portion. The stepped portion has the advantage that it stiffens the sliding cover, i.e. increases the stability of the sliding cover. In this way the bounding level of the hold-down members which is remote from the cassette housing and the outer bounding level of the parts of the main wall of the cassette housing which are not covered by the sliding cover can be made to coincide.

In a cassette in accordance with the invention, in which the sliding cover is substantially U-shaped in a cross-sectional view perpendicular to its direction of movement and comprises a first flange which extends parallel to a main wall of the cassette housing and forms the plate-shaped portion over whose edge zone the hold-down means engage, and a second flange which extends parallel to the other main wall of the cassette housing, it is also found to be advantageous if in its edge zone the second flange which extends parallel to the other main wall has an end portion which is right-angled relative to the other main wall and extends parallel to the direction of movement of the sliding cover, and the other main wall is formed with a guide slot which extends parallel to the direction of movement and is engaged by the right-angled end portion of the second flange of the sliding cover to guide the sliding cover. This is advantageous in view of a very simple and effective guidance of the sliding cover on the cassette housing and a simple mounting of the sliding cover on the cassette housing.

BRIEF DESCRIPTION OF THE DRAWINGS

The invention will now be described in more detail on the basis of some exemplary embodiments which are shown in the drawings but to which the invention is not limited.

FIG. 1 is an axonometric representation of a first embodiment of a cassette containing a record carrier in the form of a magnetic tape in a situation in which a sliding cover of this cassette is not yet connected to the cassette housing;

FIG. 2 is an axonometric representation of a sliding cover for the cassette shown in FIG. 1;

FIG. 3 shows the cassette of FIG. 1 in the same way as FIG. 1 but in a situation in which the sliding cover shown in FIG. 2 has been mounted on the cassette housing;

DESCRIPTION OF THE PREFERRED EMBODIMENTS

Figure 4:
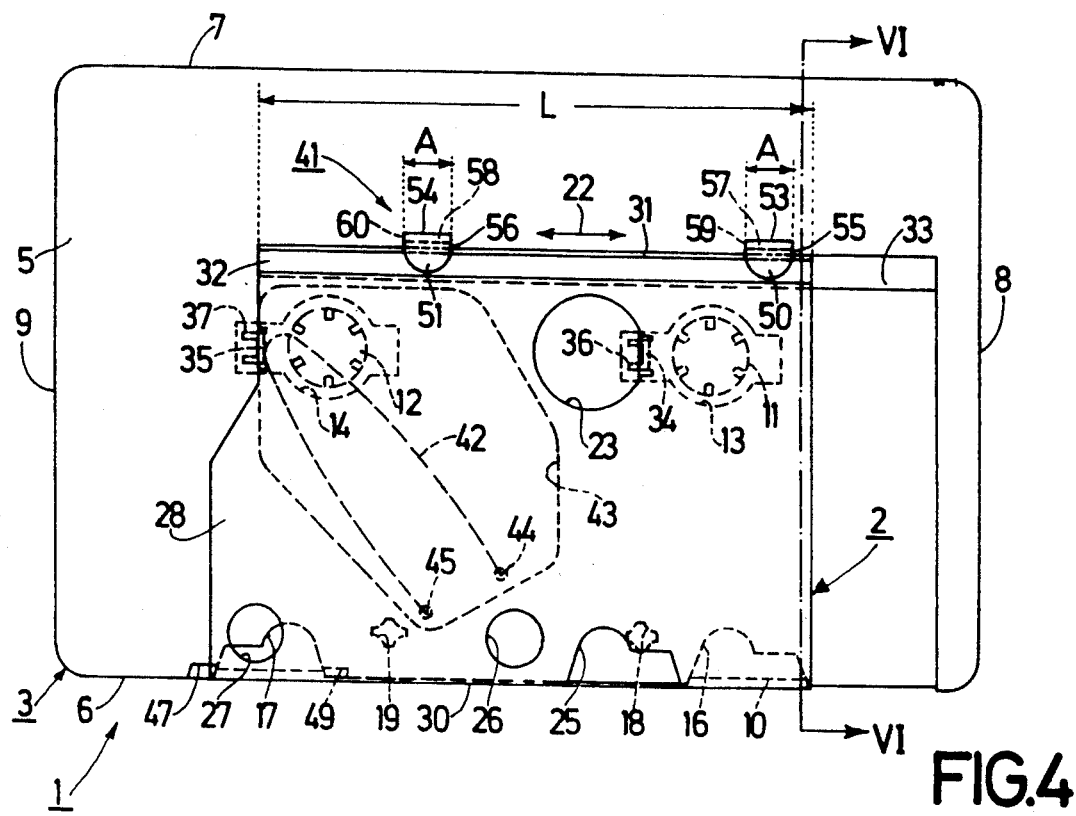
FIG. 4 is a plan view of the lower main wall of the cassette of FIG. 3 in a position turned through 180° relative to the position in FIG. 3, the sliding cover of the cassette being in a closed position.

FIG. 1 shows a cassette 1 in a situation in which a sliding cover shown in FIG. 2 has not yet been mounted on the housing 3 of the cassette 1. The housing 3 of the cassette 1 is rectangular and comprises an upper wall 4 and a lower wall 5 forming the main walls, a long narrow front wall 6, a long narrow rear wall 7, a short left-hand side wall 8 and a short right-hand side wall 9.

Figure 5:
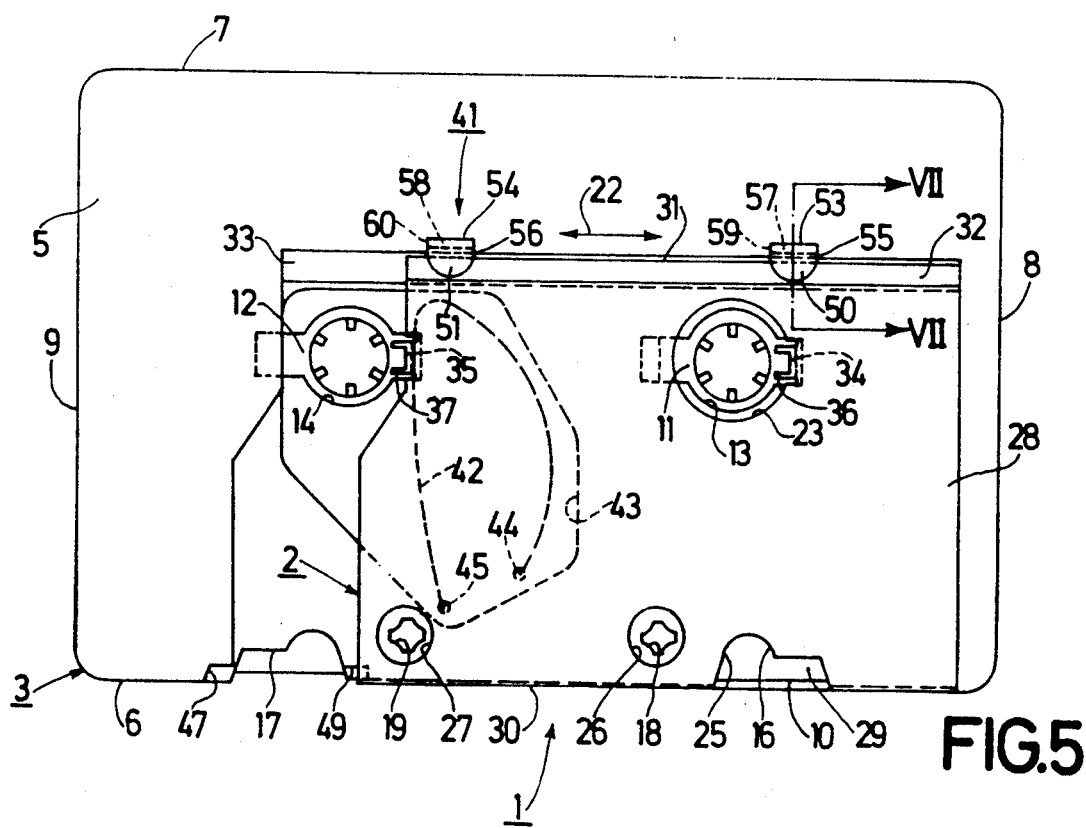
FIG. 5 shows the cassette of FIGS. 3 and 4 in the same way as in FIG. 4, the sliding cover of the cassette being in an open position.
Figure 6:
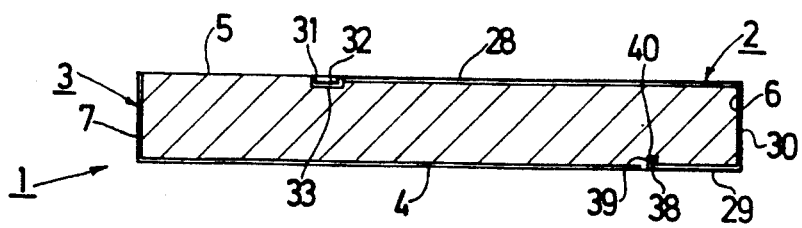
FIG. 6 shows the cassette of FIGS. 3 and 4 in a diagrammatic sectional view taken on the line VI—VI in FIG. 4.

The cassette 1 serves to accommodate a record carrier 10, which in the present case is formed by a magnetic tape. In a manner known per se the magnetic tape 10 can be wound between two rotatable reel hubs 11 and 12, whose central portions are shown in FIGS. 4 and 5. Winding mandrels of a recording and/or reproducing apparatus serve for driving the reel hubs 11 and 12, which apparatus is adapted to receive the cassette 1 for the purpose of making and/or reproducing recordings. The winding mandrels 11 and 12 can be introduced into the interior of the cassette 1 through openings 13 and 14 in the lower wall 5 of the cassette housing 3 to engage and drive the reel hubs 11 and 12.

For making and/or reproducing recordings, for example of music, speech and the like, the magnetic tape 10 can be scanned by at least one magnetic head, not shown, forming the scanning means of a recording and/or reproducing apparatus. In order to enable the magnetic tape 10 to be scanned by means of such a magnetic head the cassette housing 3 of the cassette 1 has an access area in which the magnetic head can cooperate with the magnetic tape 10 for the purpose of scanning. In the present cassette 1 this access area is in principle formed by a rectangular opening 15 in the front wall 6 of the cassette housing 3, across which opening the magnetic tape 10 extends.

When recordings are made and/or reproduced the magnetic tape 10 is moved with a constant speed of transport past the magnetic head which cooperates with the magnetic tape 10 through the opening 15 for the purpose of scanning. In order to drive the magnetic tape 10 with a constant speed of transport two capstans of a recording and/or reproducing apparatus cooperate with the magnetic tape 10, which capstans are each driven with a constant number of revolutions, the magnetic tape being pressed against these capstans by means of two movable and rotatably supported pressure rollers of the recording and/or reproducing apparatus. To give the capstans and the pressure rollers access to the magnetic tape 10 the cassette housing 3 has two further openings 16 and 17 which both extend from the upper wall 4 along the front wall 6 into the lower wall 5 of the cassette housing 3. The capstans engage behind the magnetic tape 10 through the parts of the openings 16 and 17 in the lower wall, after which the magnetic tape 10 is pressed against the capstans by the pressure rollers which are brought into contact with the magnetic tape 10 through the parts of the openings 16 and 17 in the upper wall.

To enable the cassette 1 to be positioned accurately in its operating position after insertion into a recording and/or reproducing apparatus the cassette 1 has two substantially star-shaped locating apertures 18 and 19 in its lower wall 5. These locating apertures 18 and 19 are engageable by locating pins of a recording and/or reproducing apparatus, which pins have a shape corresponding to that of the locating apertures. Two further openings 20 and 21 are formed in the upper wall 4 opposite the locating apertures 18 and 19 in the lower wall 5 and are engageable by the thin cylindrical free end portions of the locating pins in the case that the locating pins actually have this length, which is not necessary.

Thus, the cassette 1 has several openings, namely the openings 13, 14, 15, 16, 17, 18, 19, 20 and 21. If no further precautions are taken dirt particles can readily reach the interior of the cassette through these openings, which leads to soiling, which is particularly undesirable if the particles which have penetrated the cassette interior settle on the magnetic tape, because this results in a deterioration of the recording and reproducing quality and damaging of the magnetic head which cooperates with the magnetic tape. Some of these openings are also liable to give rise to mechanical damage to the magnetic tape 10.

In order to preclude these problems the cassette 1 is provided with a sliding cover 2 which is guided on the cassette housing 3 so as to be movable parallel to a direction indicated by a double arrow 22. The sliding cover 2 is movable between a closed position shown in FIGS. 3 and 4 and an open position shown in FIG. 5. In its closed position the sliding cover 2 wholly covers the openings 13, 14, 15, 16, 17, 18, 19, 20 and 21 and consequently also the access area which exposes the magnetic tape 10 at the location of the opening 15, enabling a magnetic head to cooperate with the magnetic tape 10 for scanning purposes, so that in principle the cassette 1 is closed comparatively effectively and dirt particles cannot readily penetrate the cassette interior. In its open position the sliding cover 2 exposes the openings 13, 14, 15, 16, 17, 18 and 19 and hence said access area in which a magnetic head can be made to cooperate with the magnetic tape 10 for scanning. For this purpose the sliding cover 2, which is suitably constructed as a thin sheet-steel part, has openings 23, 24, 25, 26 and 27 corresponding to the openings 13, 15, 16, 18 and 19. The sliding cover 2 does not have any openings corresponding to the openings 14 and 17 in the cassette housing 3, because the outline of the sliding cover 2 is such that in its open position the sliding cover 2 exposes the openings 14 and 17 in the cassette housing 3 without the provision of separate openings in this sliding cover.

The sliding cover 2 is substantially U-shaped in a cross-sectional view perpendicular to its direction of movement 22. The sliding cover 2 has a substantially plate-shaped first flange 28 extending parallel to the lower wall 5 of the cassette housing 3 and a second flange 29 extending parallel to the upper wall 4 of the cassette housing 3. These two flanges 28 and 29 are interconnected by a web 30 which extends parallel to the front wall 6 of the cassette housing 3.

The first flange 28, which is formed by a plate-shaped portion, has an edge zone 31 extending parallel to the direction of movement 22 and having a predetermined length. In this edge zone 31 the plate-shaped first flange 28 of the sliding cover 2 has a stepped portion 32 which is offset towards the cassette housing. The lower wall 5 of the cassette housing 3 has a trough-shaped recess 33 to receive the stepped portion 32 of the sliding cover 2.

The plate-shaped first flange 28 of the sliding cover 2 comprises two projections 34 and 35 which extend transversely of this flange 28. Each of these two projections 34 and 35 serves as a blocking member to limit the free movement of the magnetic tape 10 in the cassette housing 3 when the sliding cover 2 is in its closed position. For this purpose each of the two projections 34 and 35 comprises two teeth 36 and 37. The projections 34 and 35 with their teeth 36 and 37 project into the cassette interior through the openings 13 and 14 in the lower wall 5 of the cassette housing 3. In the closed position of the sliding cover 2 the teeth 36 and 37 cooperate with splines, not shown, on the reel hubs 11 and 12 for the magnetic tape 10 and thereby block the reel hubs 11 and 12 against rotation.

The sliding cover 2 is guided perpendicularly to the upper wall 4 and the lower wall 5 in that the two flanges 28 and 29 of the sliding cover 2 are in sliding engagement with the lower wall 5 and the upper wall 4 respectively. In order to guide the sliding cover 2 also perpendicularly to the front wall 6 the second flange 29 of the sliding cover 2, which flange extends parallel to the upper wall 4, has a strip-shaped end portion 39 in its edge zone 38, which end portion is right-angled towards the upper wall 4 and extends parallel to the direction of movement 22 of the sliding cover 2, and the upper wall 4 of the cassette housing 3 has a guide groove 40 which extends parallel to the direction of movement 22 and is engaged by the right-angled strip-shaped end portion 39 of the second flange 29 of the sliding cover 2 in order to guide the sliding cover 2.

In order to prevent the plate-shaped first flange 28 of the sliding cover 2 from being lifted off the lower wall 5 of the cassette housing 3 there are provided hold-down means 41, which are connected to the cassette housing 3 and which overlie the plate-shaped first flange 28 of the sliding cover 2 in its edge zone 31. The hold-down means 41 will be described in more detail hereinafter.

The sliding cover 2 is loaded towards its closed position by a spring 42 which bears against the cassette housing 3 and is arranged in a recess 43 in the cassette housing 3 at the housing exterior. This loading spring 42 is a substantially U-shaped wire-type bending spring whose two right-angled end portions 51 and 52 engage holes in the lower wall 5 and thus bear against the lower wall 5. The two spring end portions 44 and 45 are offset from one another both in a direction parallel to and perpendicular to the direction 22 of movement of the sliding cover 2, so that the bending spring 42 is given a bias which dictates the force with which the sliding cover 2 is loaded. The U-shaped bending spring 42 acts on the sliding cover 2 with a spring portion situated between its two spring end portions 44 and 45. The projection 35, which serves as a blocking member, is also used as the contact point for the bending spring 42.

The bending spring 42 thus urges the sliding cover 2 into a closed position. In order to enable a recording and/or reproducing process to be performed in a recording and/or reproducing apparatus the sliding cover 2 should be moved from its closed position to its open position against the force of the bending spring 42. After the cassette 1 has been loaded into the recording and/or reproducing apparatus the sliding cover 2 moved into its open position by means of an actuating device of the apparatus, which device engages with one end of the sliding cover 2 in the two transitional areas between the web 30 and the first flange 28 and between the web 30 and the second flange 29 of the sliding cover 2. In order to permit this engagement with the actuating device of the apparatus the cassette housing 3 has recesses 46, 47, 48 and 49 at opposite sides of the opening 17 in the two transitional areas between the front wall 6 and the lower wall 5 and between the front wall 6 and the upper wall 4.

In the present cassette 1 the hold-down means 41 are formed very advantageously by two spaced-apart hold-down members 50 and 51. Each of these hold-down members 50 and 51 has a dimension A parallel to the direction of movement 22 of the sliding cover 2 which is only a fraction of the length L of the edge zone 31 of the plate-shaped first flange 28 of the sliding cover 2 over which the hold-down members 50 and 51 overlie. As a result of this small construction of the hold-down members 50 and 51 fluctuations of the ambient temperature hardly affect the shape of the hold-down members, so that these hold-down members always perform their hold-down function in a constant and satisfactory manner over the entire permissible temperature range. The small dimensions of the hold-down members 50 and 51 have the advantage that no dirt particles can settle between the hold-down members 50 and 51 and the lower wall 5, so that the slidability of the sliding cover 2 cannot be impaired by such dirt particles. In the area in which the hold-down members 50 and 51 overlie the plate-shaped first flange of the sliding cover 2 the hold-down members are semicircular but they may have another shape, for example elliptical or angular.

Figure 7:
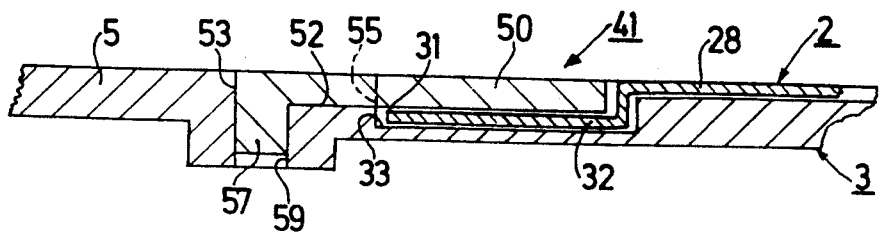
FIG. 7 shows a part of the cassette of FIGS. 3, 4 and 5 in a sectional view taken on the line VII—VII in FIG. 5 and to a substantially larger scale than FIG. 5.
Figure 8:
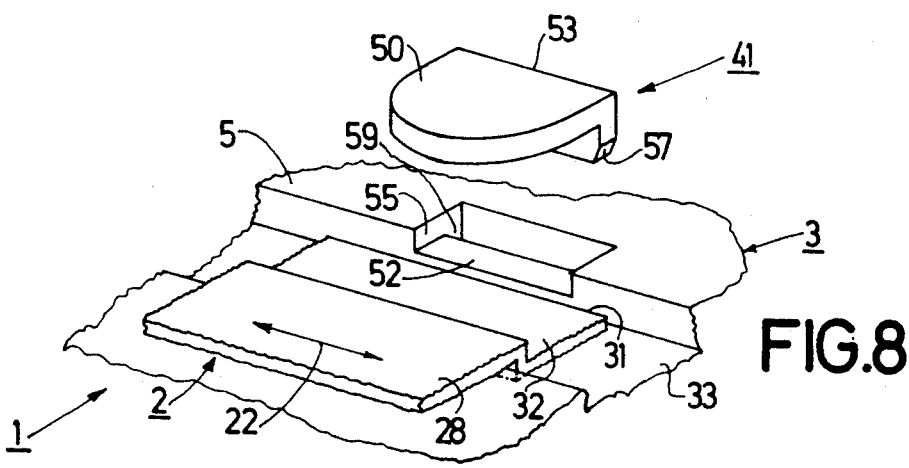
FIG. 8 is an axonometric representation of the part shown in FIG. 7 of the first embodiment of the cassette as shown in FIGS. 1 to 7.

As is shown in FIGS. 7 and 8 the hold-down members 50 and 51 are parts which are separate from the cassette housing 3 and are connected to the cassette housing 3 after the sliding cover 2 has been mounted on this housing 3. This enables the sliding cover to be mounted on the cassette housing 3 in a simple manner without being hindered by the hold-down members 50 and 51. The hold-down members 50 and 51 can be connected to the cassette housing 3, for example, by ultrasonic welding. The ultrasonic weld is made in the simplest and most favourable manner in the area which directly adjoins the trough-shaped recess 33 and which is situated between the hold-down members 50 and 51 and the cassette housing 3, this area bearing the reference numeral 52 in FIGS. 7 and 8.

At the location of their respective ends 53 and 54 which are remote from the edge zone 31 of the plate-shape first flange 28, as is also shown in FIGS. 7 and 8, the hold-down members 50 and 51 engage recesses 55 and 56 in the lower wall 5 of the cassette housing 3, to which wall the plate-shaped flange 28 of the sliding cover extends essentially parallel. These recesses 55 and 56 are adapted to, or complementary to, the shape of the hold-down members 50 and 51. This is advantageous for a simple mounting of the hold-down members 50 and 51 on the cassette housing 3 because the hold-down members 50 and 51 can be fitted simply into the recesses 55 and 56, which can be effected simply in an automated manner. The recesses 55 and 56 of suitable shape also position the hold-down members 50 and 51 before they are fixedly connected to the cassette housing 3, which is also possible by means of an adhesive. Moreover, this ensures that the bounding level of the hold-down members 50 and 51 which is remote from the cassette housing 3 and the outer bounding level of the parts of the lower wall 5 of the cassette housing 3 which are not covered by the sliding cover 2 coincide.

At the location of their respective ends 53 and 54 which are remote from the edge zone 31 of the plate-shaped first flange 28, as is further shown in FIGS. 4, 5, 7 and 8, each of the hold-down members 50 and 51 has a projection, 57 and 58 respectively, which in a cross-sectional view perpendicular to the direction of movement 22 of the sliding cover 2 extends at a right angle to the associated hold-down member 50 or 51 and which engages a respective recess 59 or 60 in the cassette housing 3. This is advantageous for a very simple connection of the hold-down members 50 and 51 to the cassette housing 3 because the projections 57 and 58 ensure a very accurate positioning of the hold-down members 50 and 51 and prevent the hold-down members 50 and 51 from slipping out of the recesses 55 and 56 as long as the hold-down members 50 and 51 have not yet been fixedly connected to the cassette housing 3. In order to preclude such slipping out of the hold-down members 50 and 51 the portions of the hold-down members 50 and 51 which engage the recesses 55 and 56 may be dovetail-shaped or may have another widening shape.

In the cassette 1 in accordance with the first embodiment shown in FIGS. 1 to 8 the projection 57 or 58 of each respective hold-down member 50 or 51 is constructed as a ridge which extends parallel to the direction of movement 22 of the sliding cover 2 and which engages a slot 59 or 60 formed as a locating aperture in the lower wall 5 of the cassette housing 3. Such a ridge 57 or 58 is very stable and highly resistant to fracture, which is advantageous in the case of automated mounting of the hold-down members on the cassette housing.

Figure 9:
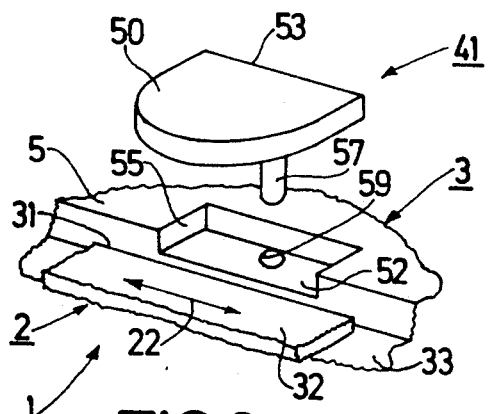
FIG. 9 shows a similar part of a second embodiment of a cassette, in the same way as FIG. 8.

In the cassette 1 in accordance with the second embodiment, of which a part is shown in FIG. 9, the projection 57 of each hold-down member 50 is constructed as a thin circularly cylindrical pin which extends perpendicularly to the lower wall 5 and which engages a circularly cylindrical hole formed as a locating aperture 59 in the cassette housing 3.

Figure 10:
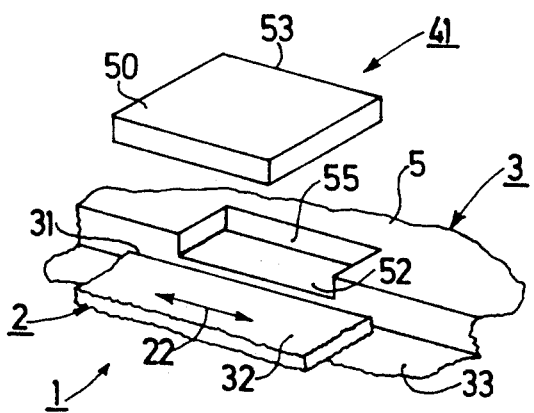
FIG. 10 shows a similar part of a third embodiment of a cassette, in the same way as FIGS. 8 and 9.

In the cassette 1 in accordance with the third embodiment, of which a part is shown in FIG. 10, each hold-down member 50 is constructed as a rectangular block. Thus, in plan view the hold-down member 50 has the shape of a rectangle or, which is very advantageous, of a square. Such a square cross-sectional shape has the advantage that the hold-down members can engage a recess in the housing in four positions rotated through 90° relative to one another. In this respect it is very advantageous to construct the hold-down members as round parts because they can then engage correspondingly shaped recesses in any arbitrary position.

In the foregoing only magnetic-tape cassettes have been described. The invention can also be used advantageously with other cassette types, for example cassettes with round disc-shaped record carriers which can be scanned magnetically or optically.

We claim:

1. A cassette for a record carrier which can be scanned by scanning means for the purpose of making and/or reproducing recordings, said cassette comprising a substantially rectangular cassette housing accommodating the record carrier and having an access area for the record carrier, in which access areas the scanning means can enter into cooperation with the record carrier for the purpose of scanning, a sliding cover which is guided on the cassette housing so as to be movable parallel to a direction of movement, which cover is movable between a closed position, in which the cover at least partly covers the access area, and an open position, in which the cover exposes the access area, said cover including a plate-shaped portion extending parallel to a main wall of the cassette housing and having an edge zone of predetermined length which extends substantially parallel to the direction of movement of the sliding cover, and hold-down means connected to the cassette housing and engaging over the plate-shaped portion in the edge zone thereof for preventing the plate-shaped portion of the sliding cover from being lifted off the main wall of the cassette housing, characterized in that:

the hold-down means comprise at least two mutually spaced-apart hold-down members which, parallel to the direction of movement of the sliding cover, each have a dimension which is only a fraction of the length of the edge zone of the plate-shaped portion of the sliding cover, over which edge zone the hold-down members engage.

2. A cassette as claimed in claim 1, characterised in that the hold-down members are constituted by parts which are separate from the cassette housing and which are fixedly connected to the cassette housing after the sliding cover has been mounted on the cassette housing.

3. A cassette as claimed in claim 2, characterised in that at the location of the respective end which is remote from the plate-shaped portion of the sliding cover the hold-down members engage recesses in the main wall of the cassette housing to which main wall the plate-shaped portion of the sliding cover extends substantially parallel, and the recesses complement the shape of the hold-down members.

4. A cassette as claimed in claim 3, characterised in that at the location of its end which is remote from the edge zone of the plate-shaped portion of the sliding cover each hold-down member has a projection which, in a cross-sectional view perpendicular to the direction of movement of the sliding cover, extends at a right angle to the associated hold-down member and which engages a locating aperture in the cassette housing.

5. A cassette as claimed in claim 4, characterised in that the projection of each hold-down member is constructed as a ridge which extends parallel to the direction of movement of the sliding cover and which engages a slot formed as a locating aperture in the cassette housing.

6. A cassette as claimed in any one of claims 1-5, characterised in that in its edge zone the plate-shaped portion of the sliding cover has a stepped portion which is offset from the plane of the plate-shaped portion towards the cassette housing, the main wall of the cassette housing is formed with a trough-shaped recess to receive the stepped portion of the sliding cover, and the hold-down members overlie the plate-shaped portion of the sliding cover only at the location of the stepped portion.

7. A cassette as claimed in any one of claims 1 through 5, in which the sliding cover is substantially U-shaped in a cross-sectional view perpendicular to its direction of movement and comprises a first flange which extends parallel to a main wall of the cassette housing and forms the plate-shaped portion over whose edge zone the hold-down means engage, and a second flange which extends parallel to the other main wall of the cassette housing, characterised in that in its edge zone the second flange which extends parallel to the other main wall has an end portion which is right-angled relative to the other main wall and extends parallel to the direction of movement of the sliding cover, and the other main wall is formed with a guide slot which extends parallel to the direction of movement and is engaged by the right-angled end portion of the second flange of the sliding cover to guide the sliding cover.

* * * * *